(12) United States Patent  (10) Patent No.: US 9,015,439 B1
Verhaeghe et al.  (45) Date of Patent: Apr. 21, 2015

(54) EVENT LOCK STORAGE DEVICE

(71) Applicant: SanDisk Technologies Inc., Plano, TX (US)

(72) Inventors: Filip Verhaeghe, Milpitas, CA (US); Bsa Chung, San Jose, CA (US); Samuel Yu, San Francisco, CA (US); Michael Lavrentiev, San Jose, CA (US)

(73) Assignee: SanDisk Technologies, Inc., Plano, TX (US)

( * ) Notice: Subject to any disclaimer, the term of this patent is extended or adjusted under 35 U.S.C. 154(b) by 0 days.

(21) Appl. No.: 14/292,047

(22) Filed: May 30, 2014

(51) Int. Cl.
  *G06F 12/00* (2006.01)
  *G06F 12/14* (2006.01)
(52) U.S. Cl.
  CPC .................. *G06F 12/1475* (2013.01)
(58) Field of Classification Search
  USPC .................. 711/163, 164
  See application file for complete search history.

(56) References Cited

U.S. PATENT DOCUMENTS

| | | | |
|---|---|---|---|
| 5,497,419 A * | 3/1996 | Hill | 380/200 |
| 8,187,936 B2 * | 5/2012 | Alsmeier et al. | 438/264 |
| 2008/0229428 A1 * | 9/2008 | Camiel | 726/27 |
| 2008/0235304 A1 * | 9/2008 | Fujii et al. | 707/205 |

OTHER PUBLICATIONS

U.S. Appl. No. 14/133,979, filed Dec. 19, 2013, 121 pages.
U.S. Appl. No. 14/136,103, filed Dec. 20, 2013, 56 pages.
Jang et al., "Vertical Cell Array using TCAT(Terabit Cell Array Transistor) Technology for Ultra High Density NAND Flash Memory," *2009 Symposium on VLSI Technology Digest of Technical Papers*, pp. 192-193, 2009.
Arya, P., "A Survey of 3D Nand Flash Memory", *EECS Int'l Graduate Program, National Chiao Tung University*, 2012, pp. 1-11.
Nowak, E. et al., "Intrinsic Fluctuations in Vertical NAND Flash Memories", *2012 Symposium on VLSI Technology Digest of Technical Papers*, 2012, pp. 21-22.

* cited by examiner

*Primary Examiner* — Jared Rutz
*Assistant Examiner* — Christopher Do
(74) *Attorney, Agent, or Firm* — Brinks Gilson & Lione (57) ABSTRACT

A system and method are disclosed for an event lock storage device. The storage device includes a user partition and an event partition (which may be associated with an event). The storage device receives data from a host device, and stores the data in the user partition. In response to receiving an indication of an event, the storage device may designate the data as part of the event partition. The event partition may include a set of access rules that is different from the user partition, such as more restrictive rules for modification or deletion of a file containing the data.

28 Claims, 8 Drawing Sheets

EVENT LOCK STORAGE DEVICE

TECHNICAL FIELD

This application relates generally to managing data in a storage device. More specifically, this application relates to a storage device restricting access to or deletion of a file in response to occurrence of a predetermined event.

BACKGROUND

A storage device may store files using a file system. When it is desired to protect the file from deletion, the file system may set the file to read only or hidden. In this way, it is less likely that the file may be deleted, either unintentionally or intentionally. However, under this protection scheme, the files may still be compromised, such as by altering the file system tables.

OVERVIEW

A system and method are disclosed for an event lock storage device. According to a first aspect, a storage device is disclosed. The storage device includes a memory and a controller in communication with the memory. The memory includes a user partition and an event partition, with the user partition having an associated first set of rules for controlling files therein, with the event partition associated with an event and having an associated second set of rules for controlling files therein, and with the second set of rules being more restrictive in at least one aspect than the first set of rules. The controller is configured to: receive, from a host device, data; store the data in a file, the file being associated with the user partition in the storage device; receive, from the host device, an indication of occurrence of the event regarding the data; and in response to receiving the indication of occurrence of the event, associate the file with the event partition of the storage device.

According to a second aspect, a method for a storage device having a memory with a user partition and an event partition is disclosed. The method includes: receiving, from a host device, data; storing the data in a file, the file being associated with the user partition in the storage device, the storage device using a first set of rules for controlling files in the user partition; receiving, from the host device, an indication of occurrence of the event regarding the data; and in response to receiving the indication of occurrence of the event, associating the file with the event partition of the storage device, wherein the storage device using a second set of rules for controlling files in the event partition, wherein the event partition is associated with the event, and wherein the second set of rules is more restrictive in at least one aspect than the first set of rules.

According to a third aspect, a storage device is disclosed. The storage device includes a memory and a controller in communication with the memory. The controller is configured to: receive, from a device external to the storage device, a command to perform an action; in response to receiving the command, access an age indicator of the storage device, the age indicator indicative of age of at least a part of the storage device; and determine, based on the accessed age indicator, whether to perform the action.

According to a fourth aspect, a method for a storage device to determine whether to perform an action in a memory of the storage device. The method includes: in the storage device: receiving, from a device external to the storage device, a command to perform an action; in response to receiving the command, accessing an age indicator of the storage device, the age indicator indicative of age of at least a part of the storage device; and determining, based on the accessed age indicator, whether to perform the action.

Other features and advantages will become apparent upon review of the following drawings, detailed description and claims. Additionally, other embodiments are disclosed, and each of the embodiments can be used alone or together in combination. The embodiments will now be described with reference to the attached drawings.

BRIEF DESCRIPTION OF THE DRAWINGS

The system may be better understood with reference to the following drawings and description. In the figures, like reference numerals designate corresponding parts throughout the different views.

DETAILED DESCRIPTION

As mentioned above, a storage device may attempt to protect a file from deletion by designating the file as read only or hidden. Under this protection scheme, however, the files may still be compromised. To improve the protection of files, the storage device may designate the file as part of an event partition responsive to determination of an event. As discussed in more detail below, the event may be based on data generated external to the storage device. Upon the storage device being notified of the event (either through a command received by a host device or through determination by the storage device), the file may be designated as part of the event partition.

The event partition may include a set of access rules that is different from other partition(s) in the storage device. For example, writing to and/or deletion of a file designated as part of the event partition may be disallowed or may be allowed only under limited circumstances. An example of limited circumstances may include analyzing age (such as wear of a part of the storage device (e.g., the average program/erase (P/E) count of a part of the NAND storage device)) of the storage device in order to perform an action (such as deletion). If the storage device has undergone a predetermined amount of age (such as a predetermined amount of wear (e.g., the average P/E count has increased by a defined percentage)), the storage device may perform the action. In this regard, the action may be performed solely dependent on the age of the storage device. The following section provides a discussion of exemplary host and storage devices that can be used with the embodiments discussed herein. Of course, these are merely examples, and other suitable types of host and storage devices may be used.

Figure 1:
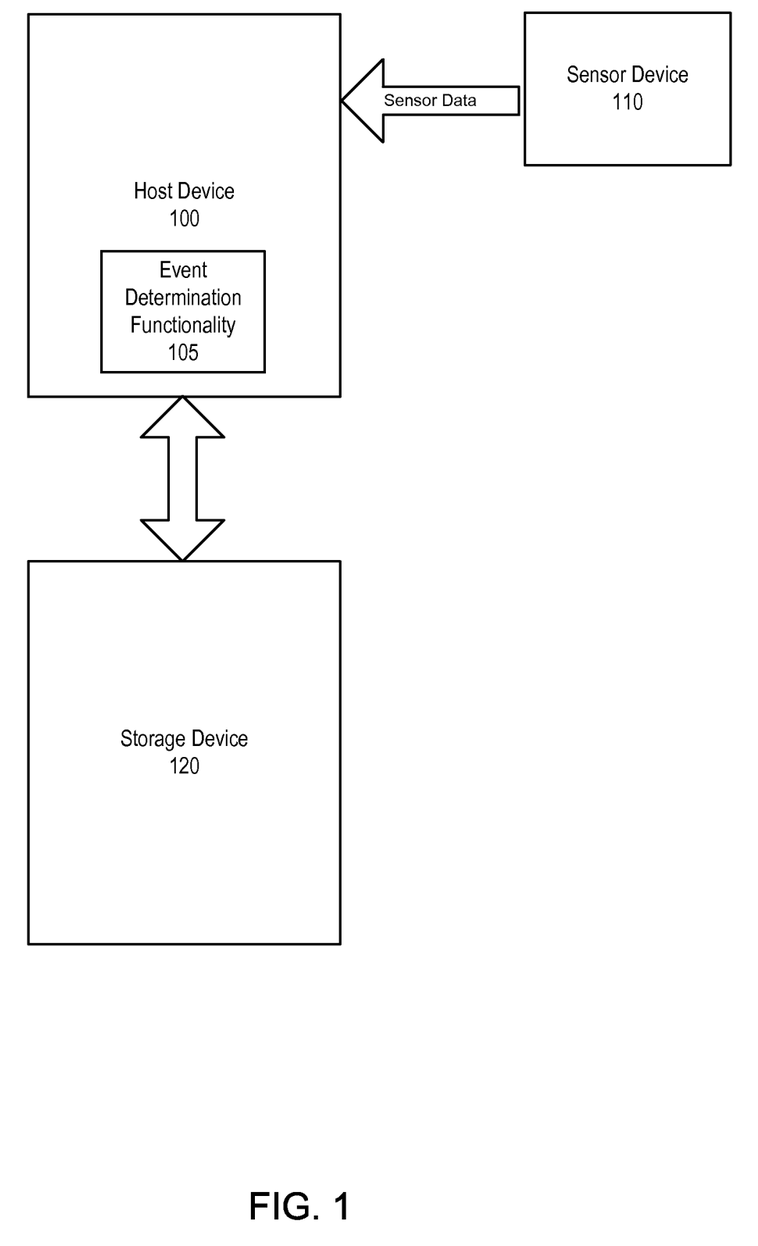
FIG. 1 illustrates a block diagram of an exemplary host device, sensor device, and storage device of an embodiment.

Turning now to the drawings, FIG. 1 illustrates a block diagram of an exemplary host device 100, sensor device 110, and storage device 120 of an embodiment. As illustrated in FIG. 1, the host device 100 is in communication with the storage device 120. As used herein, the phrase "in communication with" may mean directly in communication with or indirectly in communication with through one or more components, which may or may not be shown or described herein. In one embodiment, host device 100 and storage device 120 may each have mating physical connections that allow the storage device 120 to be removably connected to the host device 100. In an alternate embodiment, host device 100 and storage device 120 may communicate wirelessly with one another. Likewise, the host device 100 is in communication with the sensor device 110.

As illustrated in FIG. 1, the host device 100 receives sensor data from the sensor device 110. Sensor data is one example of the type of data that the host device 100 may receive that relates to input regarding a state, status or indicia of a device. In one embodiment, the state, status or indicia may be related to a device other than the host device 100 (such as input as to the state, status or indicia related to a vehicle). In an alternative embodiment, the input as to the state, status or indicia may be related to the host device 100.

In one embodiment, the sensor data may comprise data generated by the sensor device 110. For example, a camera (such as a dash-cam) may generate video data that is sent to the host device 100. As another example, a speed sensor may generate speed data that is sent to the host device 100. In an alternate embodiment, the sensor data may be derived from the data generated by the sensor device. For example, the host device 100 may be in communication with an Advanced Driver Assistance System (ADAS). ADAS may include one or more sensors, such as proximity sensors, may analyze the output of the one or more sensors, and send a warning to the host device 100 (such as a lane departure warning) based on the analysis.

The host device 100 may include event determination functionality 105. As discussed in more detail below, event determination functionality 105, which may take one of several forms, may be configured to determine whether an event has occurred, and command the storage device 120 indicating that the event has occurred (e.g., the event has occurred in the sensor data previously sent to the storage device 120 for storage or in subsequent sensor data that has not yet been sent to the storage device 120 for storage). In one embodiment, event determination functionality 105 of the host device 100 may analyze the sensor data in order to determine whether a predetermined event has occurred. For example, if the sensor data comprises vehicle speed, event determination functionality 105 of the host device 100 may analyze the vehicle speed data to determine whether the vehicle speed data indicates a speed greater than a predetermined speed. In response to determining that the vehicle speed data is greater than the predetermined speed, the host device 100 may determine that an event has occurred, and may send a command to the storage device 120, as discussed in more detail below. The command may indicate to the storage device to designate an existing file (or a part of the existing file) in the event partition, subject to certain protections. The host device 100 may use event determination functionality 105 periodically or upon receipt of new sensor data. For example, the event determination functionality 105 may analyze the sensor data every time new sensor data is received. If the event determination functionality 105 determines that the event has not occurred, the host device 100 may send the new sensor data to the storage device 120 for storage in a file designated as part of the user partition. Upon receipt of subsequent sensor data (i.e., sensor data generated subsequent to the sensor data previously sent to the storage device), the event determination functionality 105 may analyze the subsequent sensor data to determine whether the event has occurred. In response to the event determination functionality 105 determining that the event has occurred in the subsequent sensor data, the host device 120 may command the storage device to designate the file as part of the event partition. In one embodiment, the designation of the file as part of the event partition may be made after the subsequent data is sent to the storage device for storage in the file. In an alternate embodiment, the command that includes notification of occurrence of the event may also include the subsequent sensor data. In this regard, in one embodiment, the subsequent sensor data may be stored in the file before designation of the file as part of the event partition. In an alternate embodiment, the subsequent sensor data may be stored in the file after designation of the file as part of the event partition.

Alternatively, the command may indicate to the storage device that data sent along with the command (such as in the payload of the command or in a communication associated with the command) be stored in the event partition. As another example, the host device 100 may analyze the centrifugal force of the vehicle to determine whether the centrifugal force exceeds a predetermined amount. In response to determining that the centrifugal force exceeds the predetermined amount (e.g., the car was driving erratically or collided with another vehicle), the host device 100 may order to storage device 120 to create a separate recording or file of the event.

In an alternate embodiment, event determination functionality 105 of the host device 100 may analyze, independent of the sensor data, to determine whether a predetermined event has occurred. For example, event determination functionality 105 may be programmed to determine that an event has occurred at a predetermined time, such as a 12:00 PM every day. As another example, event determination functionality 105 of the host device 100 may receive an input other than from sensor device 110 indicating an event has occurred. More specifically, the input may be a manual input via a keyboard or the like on host device 100. Alternatively, the input may be from a device (not shown) separate from the sensor device 110 (such as a control server) that is in communication with host device 100.

Alternatively, event determination functionality 105 may be resident in a device other than host device 100. For example, event determination functionality 105 may be resident in the storage device 120. In this regard, the storage device 120, implementing event determination functionality 105, may determine whether an event has occurred and, in response to the determination, designate the file as part of the event partition. For example, the storage device 120 may receive the sensor data (either directly from the sensor device 120 or via host device 100), and make the determination.

The host device 100 may take any suitable form, such as, but not limited to, a mobile phone, a digital media player, a game device, a personal digital assistant (PDA), a personal computer (PC), a kiosk, a set-top box, a TV system, a book reader, or any combination thereof. The storage device 120 can take any suitable form, such as, but not limited to, a consumer, solid-state storage device, such as a Secure Digital (SD) memory card, a microSD memory card, a Compact Flash (CF) memory card, or a universal serial bus (USB)

device. In one embodiment, the storage device 120 takes the form of an iNAND™ eSD/eMMC embedded flash drive by SanDisk Corporation. Alternatively, the storage device configured for use as an internal or embedded SSD drive may look similar to that depicted in FIG. 1, with the primary difference being the location of the storage device 120 is internal to the host device 100. SSD drives may be in the form of discrete modules that are drop-in replacements for rotating magnetic disk drives.

A variety of sensor devices are contemplated. For example, a camera may be used as one type of sensor device, generating video data to send to the host device 100. As another example, sensor data may be communicated to the host device via a controller area network (CAN) bus. The host device may comprise the vehicle's control system, such as the vehicle's head unit, or may comprise a computer separate from the vehicle control system. The CAN bus may further be in communication with various sensors in a vehicle. More specifically, the CAN bus may transmit data regarding operation of the vehicle including, without limitation: operation of the cruise control; operation of the electronic brake system (including whether the brakes are operating and how the brakes are operating (e.g., whether the anti-lock braking system is activated); operation of the electronic circuitry (e.g., the operation of the steering mechanism, the operation of the accelerator pedal, the operation of the headlights (including whether the headlights are on and whether the headlights are on high-beam)); operation of the airbag system; etc. In this regard, the CAN bus may communicate sensor data to the host device. In response to receipt of the sensor data, the host device may determine whether an event has occurred, as discussed in more detail below. For example, the electronic circuitry may send to the host device 100 an indication, via the CAN bus, that the airbag has deployed. In response, event determination functionality 105 of the host device may determine that an event has occurred and command the storage device 120 accordingly.

As still another example, the host device may communicate with an Advanced Driver Assistance System (ADAS). ADAS may be composed of one or more sensors configured to determine one or more of the following: lane departure warnings, traffic congestion warning through surround cameras, rear camera, etc. In response to receiving the data from ADAS, event determination functionality 105 of the host device may determine whether an event has occurred, as discussed in more detail below.

Figure 2A:
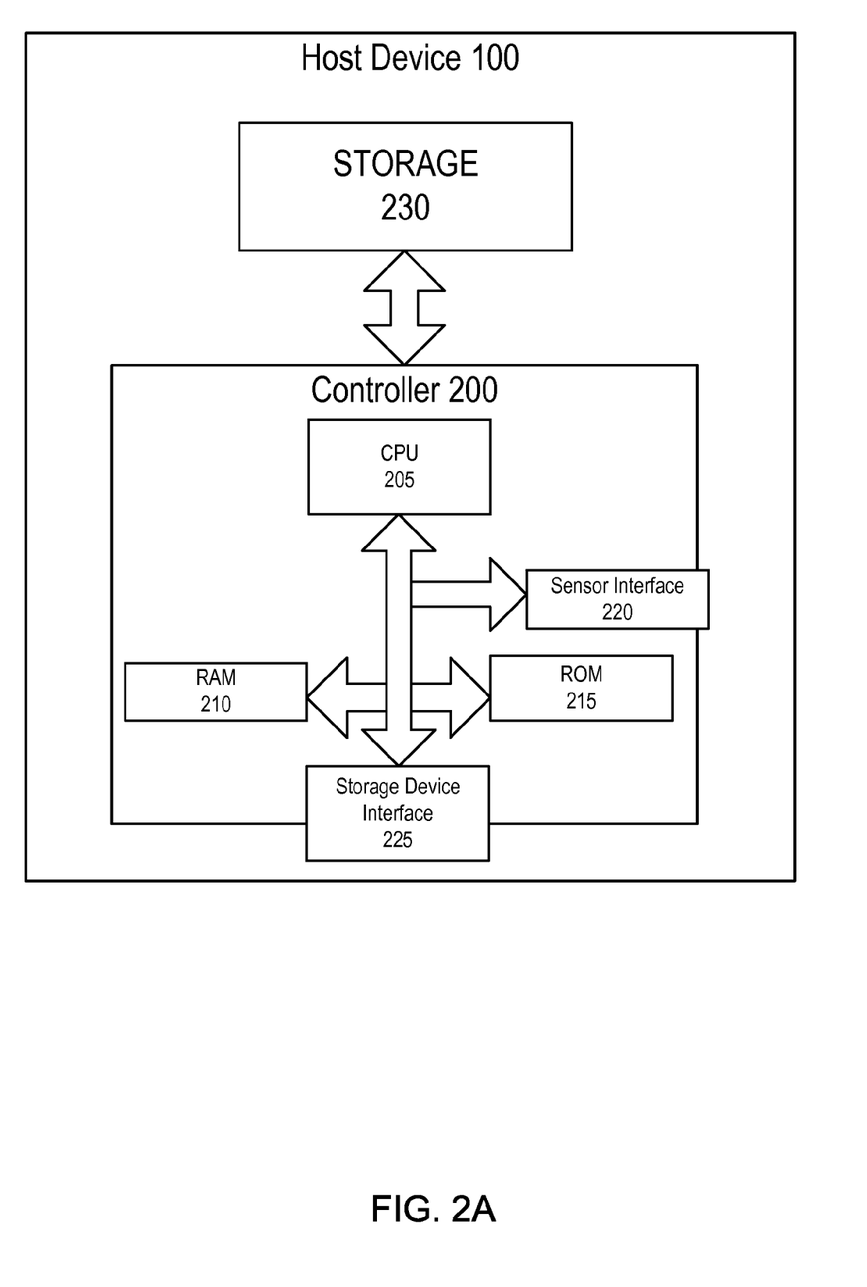
FIG. 2A is an expanded block diagram of the host device of FIG. 1.

FIG. 2A is an expanded block diagram of the host device 100 of FIG. 1. Host device 100 comprises a controller 200 that has a storage device interface 225 for interfacing with the storage device 120. The controller 200 also comprises a central processing unit (CPU) 205, random access memory (RAM) 210, read only memory (ROM) 215, and storage 230. ROM 215 or storage 230 may store instructions for execution by CPU 205. The instructions may be in one of several forms, such as firmware or the like. Execution of the instructions by the CPU 205 may be used to implement the methods ascribed to the host device 100, discussed in more detail below.

The storage device 120 and the host device 100 communicate with each other via a storage device interface 225 and a host device interface 255. The host device 100 may further include sensor interface 220, which may be configured to communicate with sensor device 110. As discussed above, sensor interface 220 may be configured to communicate via wires or wirelessly. The host device 100 may contain other components (e.g., video and/or audio sensors, a network connector, a display device, a speaker, a headphone jack, a video output connection, etc.), which are not shown in FIG. 2A to simplify the drawings.

Figure 2B:
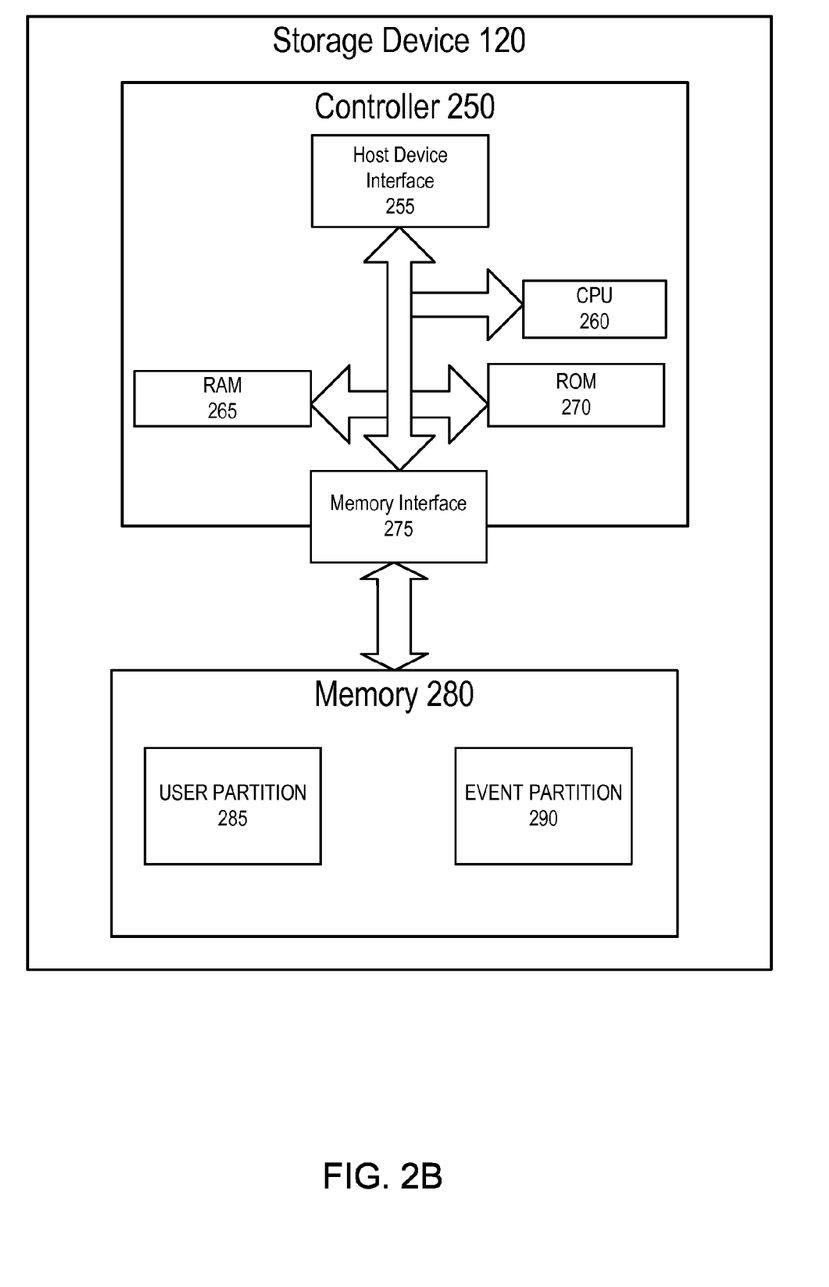
FIG. 2B is an expanded block diagram of the storage device of FIG. 1.

FIG. 2B is an expanded block diagram of the storage device 120 of FIG. 1. The storage device 120 comprises a controller 250 and a memory 280. The controller 250 comprises a memory interface 275 for interfacing with the memory 280 and a host device interface 255 for interfacing with the host device 100. The controller 250 also comprises a central processing unit (CPU) 260, random access memory (RAM) 265, and read only memory (ROM) 270, which may store firmware for the basic operations of the storage device 120. The controller 250 may be implemented in any suitable manner. For example, the controller 250 may take the form of a microprocessor or processor and a computer readable medium that stores computer-readable program code (e.g., software or firmware) executable by the (micro)processor, logic gates, switches, an application specific integrated circuit (ASIC), a programmable logic controller, and an embedded microcontroller, for example. The controller 250 may be used to implement the methods ascribed to the storage device 120, discussed in more detail below.

The memory 280 may comprise a semiconductor memory device. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional exemplary structures described but cover all relevant memory structures within the spirit and scope of the invention as described herein and as understood by one of skill in the art.

The memory 280 may comprise a single partition or multiple partitions. In one particular embodiment, the memory 280 may be divided into multiple partitions, such as two or more logical and/or physical partitions. One, some or all of the partitions in memory 280 may have independent master boot records and file system tables. The controller 250 may have a first set of rules to control a first partition and a second set of rules to control a second partition. For example, the memory 280 may comprise one or more user partitions 285 and one or more non-user partition (such as one or more event partitions 290). As discussed in more detail below, the rules to control the user partition are different from the rules to control the event partition (such as the rules for writing to and/or deleting files designated as part of the user partition may be different than the rules for writing to and/or deleting files designated as part of the event partition). FIG. 2B illustrates a single user partition 285 and a single event partition 290; however, fewer or greater numbers of partitions are contemplated. Further, the rules may relate to when a file is designated as part of a partition and/or may relate to control (e.g., reading, writing, and/or deleting) of the file within the designated partition, as discussed in more detail below.

The user partition 285 and the event partition 290 may be different partitions of the same memory unit or may be different memory units. The user partition 285 may comprise a public memory area that is managed by a file system on the host device 100. For example, the host device 100 may access the user partition 285 using Secure Digital (SD) specifications. In one embodiment, the event partition 290 may be accessible by the host device 100. For example, the event partition 290 may have characteristics defined by an independent parameter file accessible by use of existing commands identified in the SD specifications and/or by the use of vendor specific commands. Likewise, existing commands and/or extended function commands may be used for SATA, USB, CF, etc. Examples of the extended function commands to access the event partition 290 are discussed in more detail below. In an alternate embodiment, the event partition 290 is inaccessible by the host device 100. More specifically, the event partition 290 may be "private" (or "hidden") because it is internally managed by the controller 250 (and not by the host device's controller 200).

The event partition(s) 290 may be configurable in size, support specialized data deletion functionality and support unique file transfer methods. For example, the controller 250 may control the event partition 290 under a set of rules that determine when a file is designated as part of the event partition 290 and/or determine when to delete the file within the event partition 290. As discussed in more detail below, two example modes of file deletion include Write Only Read Many (WORM) and Time Erase Read Many (TERM). Further, the event partition 290 may support use of password lock. Of course, in practice, the host device 100 and storage device 120 can have fewer or different components than the ones shown in FIGS. 2A-B.

Figure 3:
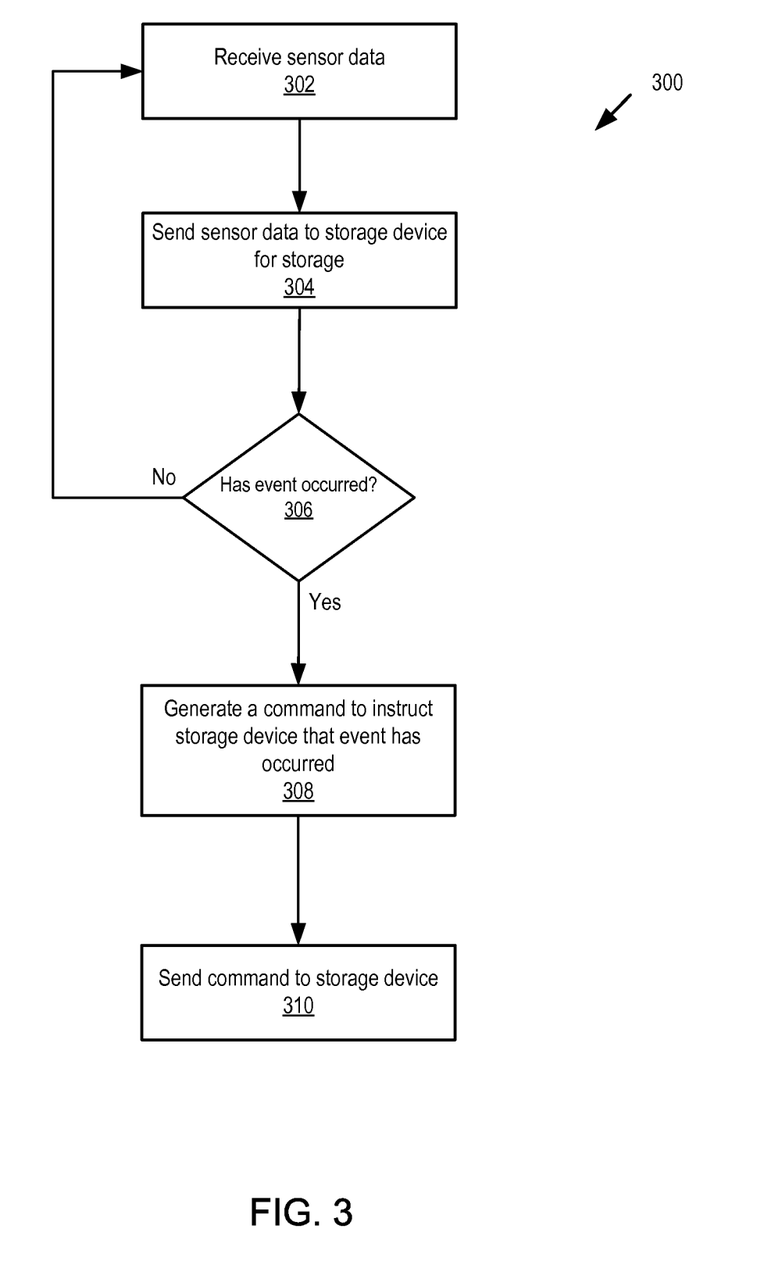
FIG. 3 is a flow diagram of a method of an embodiment for the host device to determine whether an event has occurred.

As discussed above, an event may be determined. In response to determination of the event, the file may be designated as part of the event partition 290. FIG. 3 is a flow diagram 300 of a method of an embodiment for the host device 100 to determine whether an event has occurred. At 302, the sensor data is received. As discussed above, the sensor data may comprise data generated by the sensor and/or has been derived from the data generated by the sensor. At 304, the sensor data is sent to the storage device for storage.

At 306, it is determined whether an event has occurred. As discussed above, determination of an event may be based on the sensor data or may be independent of the sensor data. In response to determining that an event has not occurred, flow diagram 300 moves back to 302. In this regard, the host device may iteratively determine whether the event has occurred in the sensor data. More specifically, after the host device 100 has sent a first set of sensor data to the storage device 120 for storage in a file in the user partition, the host device 100 may determine whether the event has occurred in a second set of sensor data (which may be generated subsequent to the first set of sensor data). In the event that the event has occurred in the second set of sensor data, the host device 100 may command the storage device 120 of the event, thereby resulting in the file (which includes the first set of sensor data stored therein) being designated as part of the event partition, as discussed in more detail below.

In response to determining that an event has occurred, at 308, the host device 100 may generate a command to instruct the storage device 120 that an event has occurred. There are several ways in which the command may indicate to the storage device 120 that the command relates to the event partition.

In one way, the command may comprise a typical SD command; however, one or more fields indicate that the command relates to the event partition. For example, the address range for the command may be outside of the valid range. One type of address range may comprise logical block addresses (LBAs). When communicating with the storage device 120, the host device 100 may send logical addresses of data, such as in the form of a range of LBAs. The storage device may then convert the LBAs, in one or more steps, to the actual physical addresses on the memory 280. Typically, the controller 250 performs a logical address-to-actual physical address conversion in order to map to the actual physical addresses. For example, the LBAs from the host device 100 may be mapped to memory system internal logical addresses, and the memory system internal logical addresses are mapped to the actual physical addresses. As another example, the LBAs from the host device 100 may be mapped directly to the actual physical addresses. In the event that the LBAs are outside of the range of mapping to actual physical addresses, instead of the controller 250 of the storage device 120 rejecting the command, the controller may review other fields, such as the payload, in order to process the command, as discussed in more detail below. At 310, the host device 100 may send the command to the storage device 120.

As still another example, the command may include an LBA address may be within the acceptable range of addresses, and another field (such as the payload) may relate to the event partition. More specifically, the payload may include the signature (such as a 16 32-byte predetermined sequence) indicating that the command (or a subsequently sent command) relates to the event partition.

Figure 4:
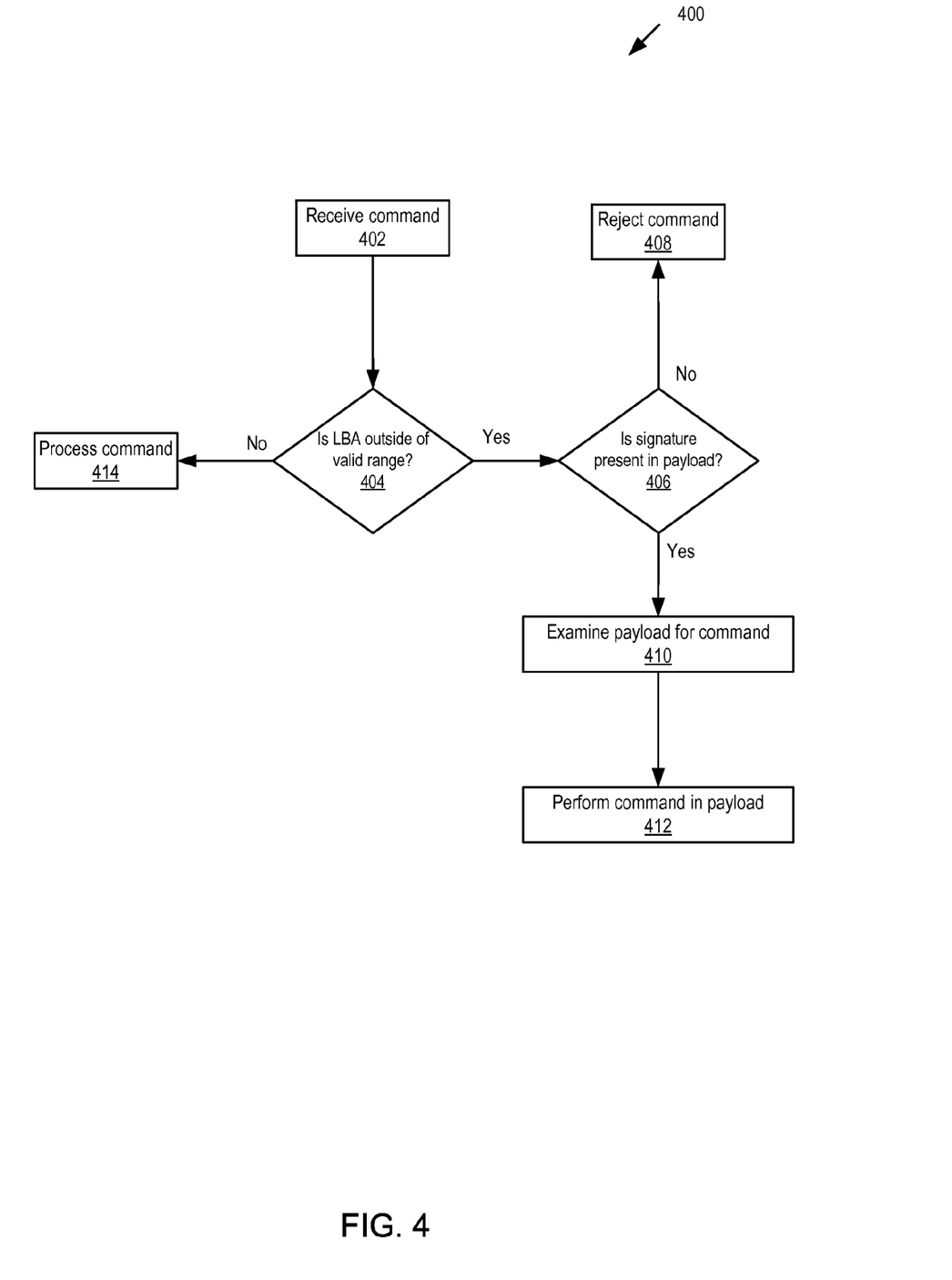
FIG. 4 is a flow diagram of a method of an embodiment for the storage device to process a command received from the host device.

FIG. 4 is a flow diagram 400 of a method of an embodiment for the storage device to process a command received from the host device. At 402, the storage device receives the command. At 404, the storage device determines whether the command is outside of the valid range. As discussed above, including an LBA that is outside of the valid range may indicate to the storage device that the command relates to the event partition.

In response to determining that the LBA is in a valid range, at 414, the command may be processed under the ordinary communication specification (such as the SD specification). In response to determining that the LBA is outside the valid range, at 406, it is determined whether a signature is present in the payload. As discussed above, different fields of the command may be used to process the command. For example, the host device may include a signature (such as a 16 32-byte predetermined sequence) in the payload of the command. The storage device may review the payload to determine whether the signature is present. If it is determined that the signature is not present, at 408, the command is rejected.

If it is determined that the signature is present, at 410, the payload is examined for a command. At 412, the storage device may then perform the command in the payload. The commands may include designation of an event, reading a file in the event partition, writing to a file in the event partition, and/or deleting a file in the event partition. Other commands are contemplated.

For example, the payload may indicate that an event has occurred. As discussed above, one or more events may be determined either by the host device or by another device. In the event that the host device determines the event, the host device may include an indication of the event in the command. In one embodiment, the host device determines whether a single event has occurred. If the event has occurred, the host device includes an indication of the event in the command, and a description of the file associated with the event (such as an LBA range for the file). In response, the storage device may process the command by designating the file as part of the event partition.

In one embodiment, the storage device may designate the LBA range of the file as part of the event partition (e.g., LBA range previously designated as part of the user partition is then designated or tagged as part of the event partition). In another embodiment, the LBA range of the user partition may be reduced, and the LBA range of the event partition may be increased. In this regard, the storage device may update the event area file system tables to reflect the change of the LBA range as part of the event partition. In a more specific embodiment, the storage device may consolidate the file in a more contiguous LBA range prior to designating the more contiguous LBA range as part of the event partition. In order to maintain a balance of the amount of space designated to the event partition and the user partition, the storage device may de-designate a similar (or the same) amount of space in the event partition that is unused to become user partition space. In this regard, the balance between the space allotted to the event and user partitions may be maintained. In an alternate embodiment, the storage device may previously designate a defined section in memory 280 as the event partition. In response to receiving the command, the storage device may then move the file to the part of memory previously designated as the event partition.

In an alternate embodiment, the event may be selected from a plurality of potential events. In response to the storage device receiving the command, the storage device may determine which particular event, from the plurality of events, is indicated in the command. In response, the storage device may process the command by designating the file as part of the event partition associated with the particular event. For example, in the context of monitoring a vehicle for events, the potential events may include: (1) non-emergency event(s); or (2) emergency event(s). The non-emergency event may comprise, for example, a predetermined time period elapsing (such as indicating that the current time is 5:00 PM). The emergency event may comprise, for example, an airbag deploying in the vehicle. In response to the host device determining that the event has occurred, the host device may send the indication of the event in the payload of the command. In the example of the predetermined time period elapsing, the host device may include in the command "End_of_Day" indication, indicating to the storage device that the event is the end of the business day. In the example of the airbag deploying, the host device may include in the command "accident" indication, indicating to the storage device that the vehicle has been in an accident. In response to the storage device determining that the command includes an "End_of_Day" indication, the storage device may designate the file indicated in the command as part of the "End_of_Day" partition. Likewise, in response to the storage device determining that the command includes an "accident" indication, the storage device may designate the file indicated in the command as part of the "accident" partition, which is separate from the "End_of_Day" partition.

As another example, the payload may indicate that the host device seeks to read a file designated as part of the event partition. As discussed above, the indication that the host device seeks to read a file from the event partition may be included in the payload of the command. For example, the payload may include an indication of designation of the event, and may also include an indication of the file (such as a name of the file) to be designated as part of the event partition. In response to receiving the command, the storage device may process the command. In the instance of a read command, the storage device may optionally first determine whether reads of files in the event partition are allowed. If so, the storage device may further optionally determine if the file is password locked. If so, the storage device may review whether the correct password is included in the command, such as in the payload. In the event that the host device is allowed to read the file from the event partition, the storage device sends the file to the host device.

As still another example, the payload may indicate that the host device seeks to write to a file designated as part of the event partition. In response to receiving the write command, in one embodiment, the storage device may first determine whether writing onto files designated as part of the event partition is allowed. In response to determining that writing onto files designated as part of the event partition is disallowed, the storage device may either reject the command or may write the data into another file (and name the other file based on the original name of the file). For example, if the name of the file designated as part of the event partition is "Accident_June_15_2014" and if a command requests overwriting part or all of the file (e.g., designating an LBA range that includes "Accident_ June _15_2014" or listing "Accident_June_15_2014" for writing), the storage device may store the data into a new file and name the new file "Accident_June_15_2014_1". In this regard, commands requesting event partition files be rewritten may be renamed with a count indicator (indicative of a number of times the file has been requested to be rewritten), and the original file in the event partition may be retained.

In an alternate embodiment, in response to receiving the write command, the storage device may first determine whether writing of files designating as part of the event partition are allowed. If so, the storage device may further optionally determine if the file is password locked. If the file is password locked, the storage device may review whether the correct password is included in the command, such as in the payload. In the event that the host device is allowed to write to the file designated as part of the event partition, the storage device may overwrite the file. In one embodiment, the file may be overwritten after an age indicator (such as the program/erase count) is a certain value, as discussed in more detail below. In this regard, the file may be modified after a determination that the correct password was received and a determination that the age indicator is a certain value.

As yet another example, the payload may indicate that the host device seeks to delete a file designated as part of the event partition. In one embodiment, the storage device is configured to disallow deletion of any file designated as part of the event partition. As discussed in more detail below, the event partition may be a Write Once Read Many (WORM) partition. In this instance, the storage device rejects the command to delete a file designated as part of the event partition. Thus, files written, including the file system tables, may not be allowed to be deleted.

In an alternate embodiment, the file designated as part of the event partition may be deleted under predetermined circumstances. As discussed in more detail below, the event partition may be a Time Erase Read Many (TERM) partition. The file designated as part of the event partition may be deleted based on an age indicator of the storage device, as discussed in more detail below. For example, the age indicator may comprise a wear indicator, such as the program/erase (P/E) count of a part of the memory 280. More specifically, when the data is originally save to the file in the user partition, the average P/E count of the user partition may also be saved and associated with the file. File erasure may be allowed only after the user partition average erase cycle count has increased by a certain amount (such as by a defined percentage (%)). The percentage value may be a one-time programmable variable and may represent a value effectively equating to a minimum time criteria after which the file may be deleted. In this regard, files as part of the TERM partition may be deleted or overwritten only when the time criteria, as dictated by the age indicator, are met.

Figure 5:
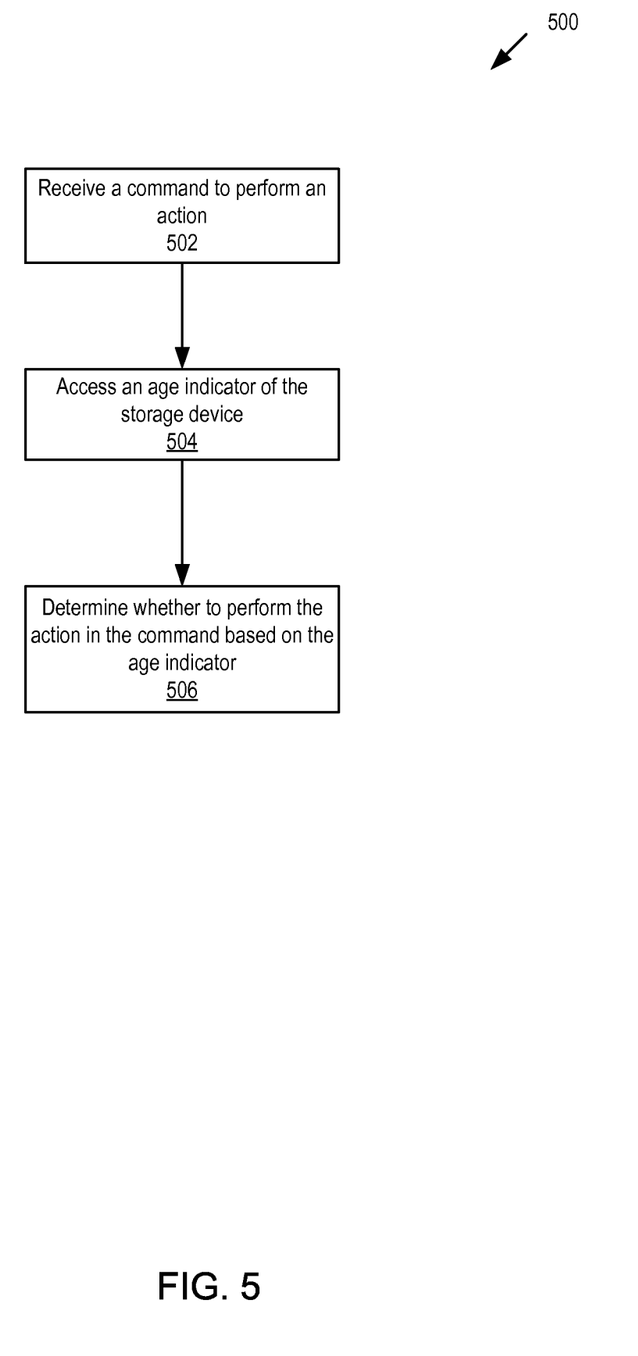
FIG. 5 is a flow diagram of a method of an embodiment for the storage device to determine whether to perform an action based on an age indicator of the storage device.

FIG. 5 is a flow diagram 500 of a method of an embodiment for the storage device to determine whether to perform an action based on an age indicator of the storage device. At 502, the storage device receives a command to perform an action. For example, the storage device may receive a command from an external device, such as host device 100. Alternatively, the storage device may receive notice of the command through an internal operation, such as a program being executed internally to the storage device.

At 504, the storage device may access an age indicator of the storage device. One specific age indicator comprises a wear indicator. There are several examples of wear indicators of the storage device. One example is the P/E count of a part of the memory (such as the user partition), as discussed above. Another example is bit error rate of a part of the storage device, such as discussed in U.S. Application No. 2014-

0115410, incorporated by reference herein in its entirety. Still another example is failure rate of a part of the storage device. In this regard, the age indicator may indicate age or wear of at least a part of the storage device. At 506, the storage device determines whether to perform the action in the command based on the accessed age indicator. For example, a certain action may be performed only when an indicator of an amount of time has passed. In the example of a P/E count being the age indicator, reprogramming different blocks of the NAND memory may, statistically, take an expected amount of time. In this regard, analyzing the P/E count (e.g., counting the number of times various blocks in the NAND have been reprogrammed and/or examining a percentage change in the P/E count) may be the basis for a time parameter that is independent of the host device.

Using the age indicator as a time indicator enables the storage device to perform the time calculation without reliance on any clock. In one embodiment, the storage device does not need to include a clock to determine a time calculation, thereby reducing the cost of the storage device. More specifically, the storage device does not need to rely on the clock of an external device (such as the host device 100) to perform the time calculation. Reliance on an external clock may be inadvisable since the external clock may be manipulated. For example, relying on time stamps, which may be manipulated, may be imprudent. Instead, the storage device may still make time-dependent decisions based on analysis of the age indicator (such as based on a change in age indicators, as discussed below). In particular, the age of a part of the memory in the storage device (such as a part of memory accessible by a host device and/or a part of memory assigned to controller 200) may be analyzed in order to determine whether to perform the action.

In an alternate embodiment, the age indicator may be dependent (either directly or indirectly) on a clock signal. More specifically, the age indicator may be dependent on an external clock signal received from an attached host device, such as from host device 100 via storage device interface 225. The controller 200 may monitor the clock signal received from the host device and determine an age based on the monitored clock signal. More specifically, the controller 200 may adjust a section in memory (such as a block in memory) dependent on the monitored block signal. In a first embodiment, the controller may modify the logical block in memory indirectly based on the monitored clock signal. For example, a counter in the logical block may be incremented for every predetermined number of clock cycles received. In a second embodiment, the controller may modify the logical block in memory directly based on the monitored clock signal (e.g. increment the counter every ten-thousand cycles). For example, a counter in the logical block may be incremented for every clock cycle received. In either embodiment, the logical block may be examined for its associated change in age (e.g., P/E cycles). In response to determining that the change in age of the logical block is greater than a predetermined amount, then the action (such as deletion) may be performed.

Figure 6:
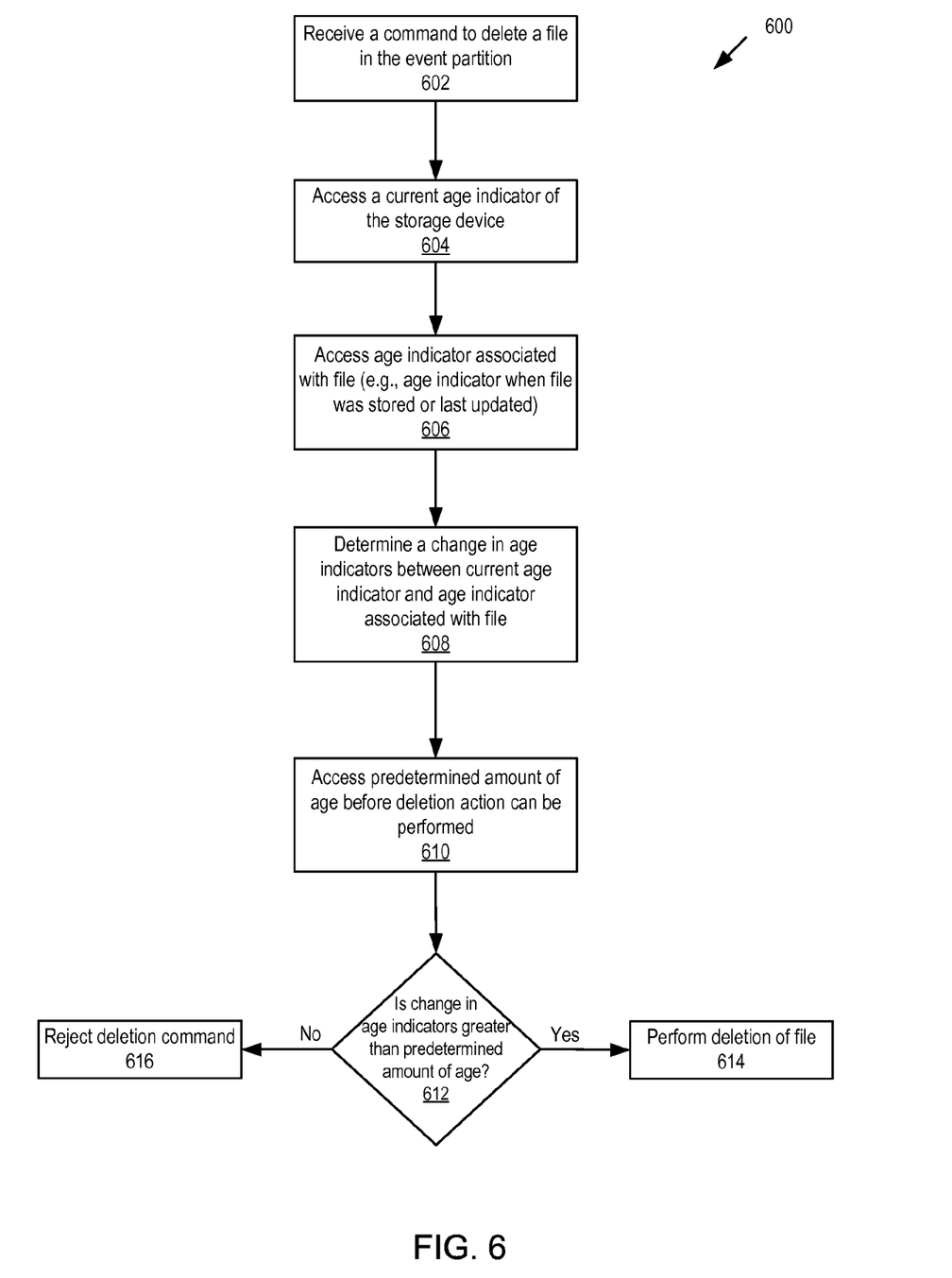
FIG. 6 is a flow diagram of a method of an embodiment for the storage device to determine whether to delete a file based on the current age indicator of the storage device and the age indicator associated with the file.

FIG. 6 is a flow diagram 600 of a method of an embodiment for the storage device to determine whether to delete a file based on the current age indicator of the storage device and the age indicator associated with the file. At 602, the command to delete a file in the event partition is received. As discussed above, different fields in the command, such as the payload, may indicate that the command is to delete the file and that the command designates a specific file, such as by including an LBA range. At 604, a current age indicator is accessed. As discussed above, one example of an age indicator is the P/E count of the user partition. At 606, the age indicator associated with the file is also accessed. For example, the age indicator when the file is first created may be stored along with the file. As another example, the age indicator when the file is last updated may be stored along with the file.

At 608, the change in age indicators between the current age indicator and the age indicator associated with the file may be determined. At 610, the predetermined amount of age before a deletion action can be performed is accessed. At 612, it is determined whether the change in age indicators (between the current age indicator and the age indicator associated with the file) is greater than the predetermined amount of age before the deletion action can be performed. If the change in age indicators is greater, at 614, then the deletion of the file is performed. If the change in age indicators is not greater, at 616, then the deletion of the file is rejected.

In the example where the age indicator is the user partition average P/E count, file erasure may be allowed only when the user partition average erase cycle count has increased by defined percentage (%). The defined percentage may be a one-time programmable variable. Thus, the defined percentage may represent a value effectively equating to a minimum time criteria. In this regard, files may be deleted and overwritten only when the minimum time criteria met.

Figure 7:
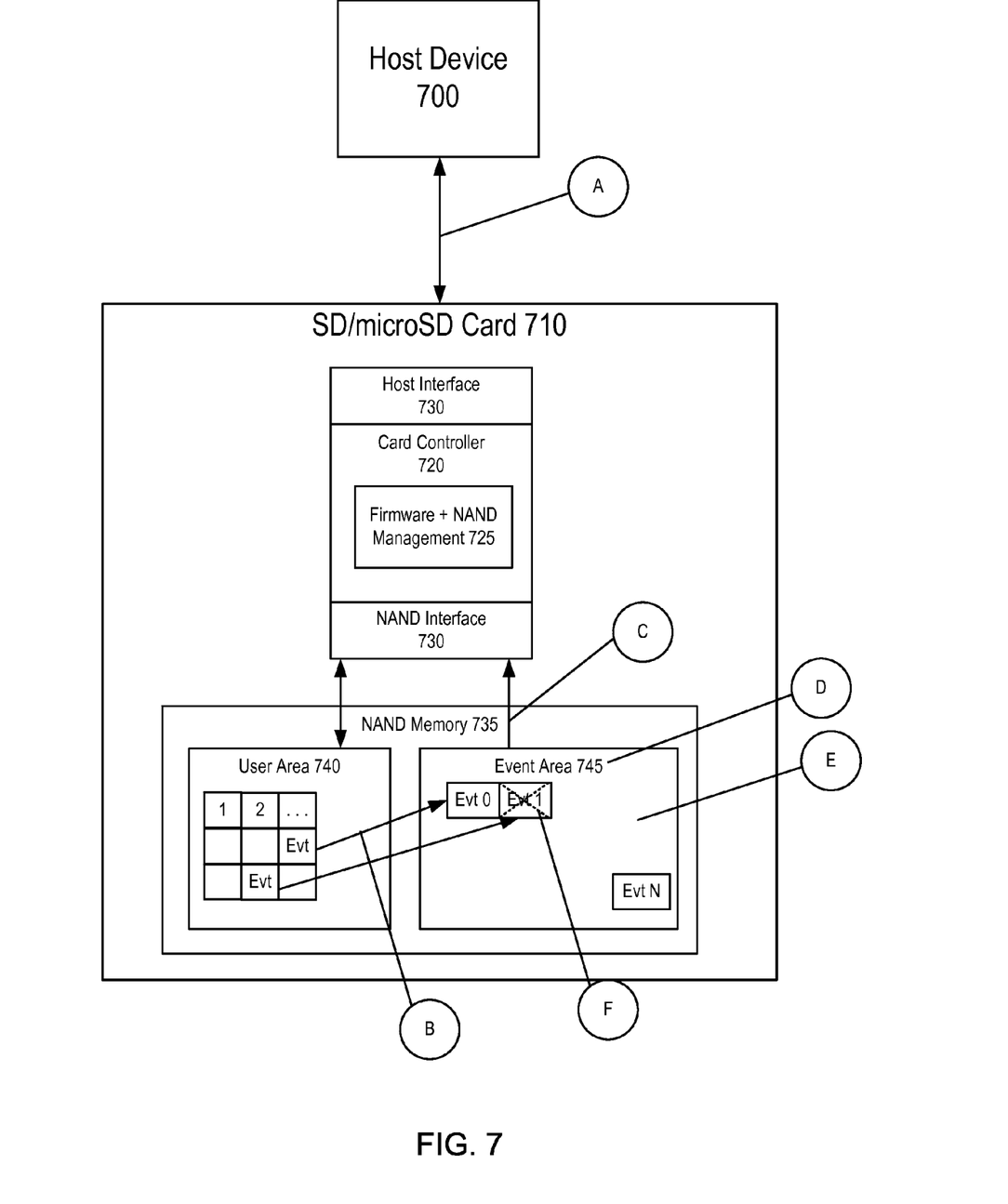
FIG. 7 is a block diagram of actions within the storage device.

FIG. 7 is a block diagram of actions within the storage device 120. At A, host device 700 sends a command to SD/micro SD card 710 via host interface 730. The command includes a command signature and is indicative to SD/micro SD card 710 to move a file into event area 745. As discussed above, the file may be identified in the command in one of several ways, such as based on file system file name transfer and/or by identifying the sectors associated with the file. At B, in response to receiving the command, the card controller 720, executing firmware and NAND management 725, designate the file as part of event area 745. As discussed above, one way in which to designate the file as part of event area 745 is by updating the Event Area File System Tables (F/S). This is one example of tagging the file so that the file is designated as part of the event area 745. Another way is to move the file to an area in memory dedicated to the event area.

Responsive to a command to read a file in the event area 745, at C, the card controller 720 may read a file in the event area 745 in NAND memory 735, via NAND interface 730. Responsive to a command to write to a file in the event area, at D, the card controller determines whether and/or what the write capability to the event area is. For example, there may be a write once read many (WORM) configuration or a time erase read many (TERM) configuration. Responsive to a command to delete a file in the event area, at E, the controller may reject the command under a WORM configuration. Alternatively, under a TERM configuration, at F, the file may be erased only when user area 740 average erase cycle count has increased by defined %.

Thus, in one embodiment, a storage device is disclosed. The storage device may include a memory and a controller in communication with the memory. The controller may be configured to: receive, from a device external to the storage device (such as a host device), a command to perform an action; in response to receiving the command, access an age indicator of the storage device (such as a current age indicator of the at least a part of the memory), the age indicator indicative of age of at least a part of the storage device; and determine, based on the accessed age indicator, whether to perform the action. The action in the command may comprise an action on a file stored in the memory of the storage device. For example, the action on the file may comprise deletion of the file stored in the memory of the storage device. In response to receiving the action to delete a file, the storage device may be configured to access an age indicator associated with the file (such as the age indicator of the at least a part of the memory when the file was created) and configured to determine whether to perform the action by comparing the age indicator associated with the file with the age indicator indicative of age of at least a part of the storage device. More specifically, the controller may be configured to determine whether to perform the action by: determining a difference between the age indicator associated with the file with the age indicator indicative of age of at least a part of the storage device; determining whether the difference is greater than a predetermined amount; in response to determining that the difference is greater than a predetermined amount, deleting the file; and in response to determining that the difference is not greater than a predetermined amount, not deleting the file. One example of an age indicator is a program/erase count for at least a part of the storage device.

In an alternate embodiment, a method for a storage device to determine whether to perform an action in a memory of the storage device is disclosed. The method includes (in the storage device): receiving, from a device external to the storage device, a command to perform an action; in response to receiving the command, accessing an age indicator of the storage device, the age indicator indicative of age of at least a part of the storage device; and determining, based on the accessed age indicator, whether to perform the action.

Accordingly, the method and system may be realized in hardware, software, or a combination of hardware and software. The method and system may be realized in a centralized fashion in at least one electronic device (such as illustrated in host device 100 and/or storage device 120 in FIG. 1) or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein. Such a programmed computer may be considered a special-purpose computer.

The method and system may also be implemented using a computer-readable media. For example, event determination functionality 105 and the functionality described in FIGS. 3-6 may be implemented using computer-readable media. A "computer-readable medium," "computer-readable storage medium," "machine readable medium," "propagated-signal medium," or "signal-bearing medium" may include any tangible device that has, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. The computer-readable medium can be a single medium or multiple media. Accordingly, the disclosure may be considered to include any one or more of a computer-readable medium or a distribution medium and other equivalents and successor media, in which data or instructions can be stored. For example, the CPU 205 and/or the CPU 260 may access instructions stored in memory, in order to provide the functionality herein. As another example, the flash memory interface(s) may be configured to implement the functionality described herein.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present embodiments are to be determined by the broadest permissible interpretation of the following claims and their equivalents, and shall not be restricted or limited by the foregoing detailed description. While various embodiments have been described, it will be apparent to those of ordinary skill in the art that many more embodiments and implementations are possible within the scope of the above detailed description. Accordingly, the embodiments are not to be restricted except in light of the attached claims and their equivalents.

What is claimed is:

1. A storage device comprising:
  memory comprising a user partition and an event partition; and
  a controller in communication with the memory, the controller configured to manage files in the user partition according to a first set of rules and manage files in the event partition according to a second set of rules different from the first set of rules, the controller configured to:
    receive data, from a host device, the host device being external to the storage device;
    store the data in a file, the file being associated with the user partition in the storage device;
    determine whether an indication of occurrence of the event was received from the host device;
    in response to determining receipt of the indication of occurrence of the event, associate the data with the event partition of the storage device solely by performing one or more internal operations within the storage device;
    receive a command from the host device to delete the file;
    determine a difference between an age indicator associated with the file with the age indicator indicative of age of at least a part of the storage device;
    determine whether the difference is greater than a predetermined amount;
    in response to determining that the difference is greater than a predetermined amount, delete the file; and
    in response to determining that the difference is not greater than a predetermined amount, reject the command to delete the file,
  wherein the memory comprises a silicon substrate and a plurality of memory cells forming at least two memory layers vertically disposed with respect to each other to form a monolithic three-dimensional structure, wherein at least one memory layer is vertically disposed with respect to the silicon substrate.

2. The storage device of claim 1, wherein deletion or modification of files associated with the event partition is more restrictive than deletion or modification of files associated with the user partition.

3. The storage device of claim 2, wherein deletion or modification of files associated with the event partition is disallowed.

4. The storage device of claim 2, wherein deletion or modification of files associated with the event partition is allowed only after an age indicator associated with at least a part of the storage device changes by a predetermined amount.

5. The storage device of claim 1, wherein the age indicator comprises program/erase count for at least a part of the user partition of the storage device.

6. The storage device of claim 1, wherein the data is generated by or derived from a sensor.

7. The storage device of claim 6, wherein the indication of occurrence of the event comprises an indication that the event occurred in the data or in subsequent data generated by or derived from the sensor.

8. The storage device of claim 1, wherein the controller is configured to associate the file with the event partition of the storage device by tagging the file so that the file is associated as part of the event partition; and
wherein, in response to tagging the file, the controller is further configured to de-designate part of the event partition so that the de-designated part is part of the user partition.

9. The storage device of claim 1, wherein the controller is configured to receive the indication of an event associated with the data by receiving a command; and
wherein the controller is further configured to:
analyze an LBA range in the command;
determine whether the LBA range in the command is outside an acceptable range; and
in response to determining that the LBA range in the command is outside an acceptable range, process the command to determine whether the command includes the indication of the event.

10. The storage device of claim 1, wherein the controller is on the same substrate as the memory cells.

11. The storage device of claim 1, wherein the storage device is one of an SSD drive embedded in the host device or a memory card.

12. A method for a storage device having a memory with a user partition and an event partition, the method comprising:
performing in the storage device:
receiving data, from a host device, the host device being external to the storage device;
storing the data in a file, the file being associated with the user partition in the storage device, the storage device using a first set of rules for controlling files in the user partition;
determining whether an indication of occurrence of the event was received from the host device;
in response to determining receipt of the indication of occurrence of the event, associating the data with the event partition of the storage device solely by performing one or more internal operations within the storage device, the storage device using a second set of rules for controlling files in the event partition, the event partition associated with the event, the second set of rules being more restrictive in at least one aspect than the first set of rules;
receiving a command from the host device to delete the file;
determining a difference between an age indicator associated with the file with the age indicator indicative of age of at least a part of the storage device;
determining whether the difference is greater than a predetermined amount;
in response to determining that the difference is greater than a predetermined amount, deleting the file; and
in response to determining that the difference is not greater than a predetermined amount, rejecting the command to delete the file,
wherein the memory comprises a silicon substrate and a plurality of memory cells forming at least two memory layers vertically disposed with respect to each other to form a monolithic three-dimensional structure, wherein at least one memory layer is vertically disposed with respect to the silicon substrate.

13. The method of claim 12, wherein deletion or modification of files associated with the event partition is more restrictive than deletion of files associated with the user partition.

14. The method of claim 13, wherein deletion or modification of files associated with the event partition is disallowed.

15. The method of claim 13, wherein deletion or modification of files associated with the event partition is allowed only after an age indicator associated with at least a part of the storage device changes by a predetermined amount.

16. The method of claim 12, wherein the age indicator comprises program/erase count for at least a part of the user partition of the storage device.

17. The method of claim 12, wherein the data is generated by or derived from a sensor.

18. The method of claim 17, wherein the indication of occurrence of the event regarding the data comprises an indication that the event occurred in the data or in subsequent data generated by or derived from the sensor.

19. The method of claim 12, wherein associating the file with the event partition of the storage device comprises tagging the file so that the file is associated as part of the event partition; and
further comprising, in response to tagging the file, de-designating part of the event partition so that the de-designated part is part of the user partition.

20. The method of claim 12, wherein receiving the indication of an event associated with the data comprises receiving a command; and
further comprising:
analyzing an LBA range in the command;
determining whether the LBA range in the command is outside an acceptable range; and
in response to determining that the LBA range in the command is outside an acceptable range, processing the command to determine whether the command includes the indication of the event.

21. The method of claim 12, wherein the storage device further comprises a controller in communication with the memory; and
wherein the controller is on the same substrate as the memory cells.

22. A storage device comprising:
memory; and
a controller in communication with the memory, the controller configured to:
receive, from a host device, data;
store the data in the memory;
receive, from the host device, a command to perform an operation on the data;
determine an age indicator indicative of age of at least a part of the storage device;

determine, based on the age indicator indicative of age of at least a part of the storage device, whether to perform the operation on the data;

in response to determining to perform the operation, perform the operation on the data; and in response to determining not to perform the operation, reject the command to perform the operation on the data, wherein the memory comprises a silicon substrate and a plurality of memory cells forming at least two memory layers vertically disposed with respect to each other to form a monolithic three-dimensional structure, wherein at least one memory layer is vertically disposed with respect to the silicon substrate.

23. The storage device of claim 22, wherein the controller is configured to determine whether to perform the operation on the data by:

determining a difference between an age indicator associated with the data with the age indicator indicative of age of at least a part of the storage device;

determining whether the difference is greater than a predetermined amount; and in response to determining that the difference is greater than the predetermined amount, determine to perform the operation.

24. The storage device of claim 22, wherein the data is stored in a file; and wherein the command comprises a delete command to delete the file.

25. The storage device of claim 22, wherein the age indicator comprises program/erase count for at least a part of the storage device.

26. A method comprising:

performing in a storage device:

receiving, from a host device, data;

storing the data in a memory of the storage device;

receiving, from the host device, a command to perform an operation on the data;

determining an age indicator indicative of age of at least a part of the storage device;

determining, based on the age indicator indicative of age of at least a part of the storage device, whether to perform the operation on the data;

in response to determining to perform the operation, performing the operation on the data; and in response to determining not to perform the operation, rejecting the command to perform the operation on the data, wherein the memory comprises a silicon substrate and a plurality of memory cells forming at least two memory layers vertically disposed with respect to each other to form a monolithic three-dimensional structure, wherein at least one memory layer is vertically disposed with respect to the silicon substrate.

27. The method of claim 26, wherein determining whether to perform the operation on the data comprises:

determining a difference between an age indicator associated with the data with the age indicator indicative of age of at least a part of the storage device;

determining whether the difference is greater than a predetermined amount; and in response to determining that the difference is greater than the predetermined amount, determine to perform the operation.

28. The method of claim 27, wherein the data is stored in a file; and wherein the command comprises a delete command to delete the file.

* * * * *